United States Patent [19]
Schneider et al.

[11] 4,064,541
[45] Dec. 20, 1977

[54] CONSTANT PULSE WIDTH SYNC REGENERATOR

[75] Inventors: Dennis Michael Schneider, Sewell; Lucas John Bazin, Vincentown, both of N.J.

[73] Assignee: RCA Corporation, New York, N.Y.

[21] Appl. No.: 700,122

[22] Filed: June 28, 1976

[30] Foreign Application Priority Data

Mar. 19, 1976 United Kingdom ............... 11121/76

[51] Int. Cl.² .............................................. H04N 5/10
[52] U.S. Cl. ..................................... 358/153; 328/139
[58] Field of Search ...................... 358/153, 155, 158; 178/69 R; 328/139, 150, 162, 164; 329/104, 106, 178, 179; 307/231, 234

[56] References Cited
U.S. PATENT DOCUMENTS

| | | | |
|---|---|---|---|
| 3,237,110 | 2/1966 | Kaye | 328/139 |
| 3,699,256 | 10/1972 | Roth | 358/153 |
| 3,805,172 | 4/1974 | Barrot et al. | 328/164 |

OTHER PUBLICATIONS

*Electronic Design;* vol. 20, No. 2, p. 100, Oct. 12, 1972; "Variable Threshold Circuit Separates Synch Pulses from Composite Video Signal".

*Primary Examiner*—Benedict V. Safourek
*Attorney, Agent, or Firm*—Eugene M. Whitacre; Mason DeCamillis

[57] ABSTRACT

A sync regenerator is provided which regenerates synchronizing information signals having a varying amplitude and width by comparing the sync signals in a comparator circuit to which a source of reference potential is applied. The comparator output signal of fixed amplitude is pulse width detected and the value of the detector output voltage is coupled by a feedback circuit to the reference potential source to vary the reference potential so as to maintain the width of the comparator output signal constant. The regenerated sync output signal is of constant amplitude and constant width.

3 Claims, 4 Drawing Figures

CONSTANT PULSE WIDTH SYNC REGENERATOR

BACKGROUND OF THE INVENTION

This invention relates to circuitry for regenerating synchronizing signals obtained from a composite television video signal.

In television systems, the synchronizing signal components of the composite video signal often become distorted and subject to noise during signal processing which results in erratic synchronism of the television picture. It is common practice, in such cases, to separate the synchronizing signals from the composite video signal and to replace the original synchronizing signals with a regenerated synchronizing signal to improve the overall picture synchronization.

Known circuits for separating and regenerating the synchronizing components from a composite video signal generally comprise a level detector and clamp circuit followed by a monostable multivibrator. In operation, such circuits generally detect the leading edge of the synchronizing pulse and, in turn, trigger the monostable multivibrator, which generates a replacement pulse of appropriate duration and amplitude. These known circuits, however, often do not produce reliable and uniform signal regeneration because the leading edge of the original pulse may itself be distorted or noisy, which will offset the detection, timing and initiation of the monostable multivibrator. Additional difficulties in reliable and uniform signal regeneration occur in the prior art circuitry in situations where the signal amplitude level applied to the sync separator varies substantially in amplitude as is common in switching between several video signal sources. Substantial changes in signal amplitude are particularly troublesome in developing accurate timing regneration due to the nature of the synchronizing signals, in particular, the horizontal synchronizing signal which has a well defined rise time in accordance with the NTSC standards. Substantial changes in video signal level will result in a substantial change in average picture level and a resulting shift in the time at which the threshold level of the sync separator is activated. Therefore, even though the output amplitude of the sync regenerator circuit is amplitude controlled, the timing error in initiating sync signal regeneration is coupled through to the newly regenerated signal. This timing error is particularly troublesome when one or more video signals are coupled together in a manner known as genlock, wherein the synchronizing components of a master signal are substituted for the synchronizing signals of a slaved video signal. Such timing errors are also troublesome in situations where one or more video signals are intermixed for special effects.

SUMMARY OF THE INVENTION

A sync regenerator is provided for regenerating synchronizing information signals which vary in amplitude and width. The sync regenerator comprises comparator means responsive to the synchronizing information signal and to a first reference potential for developing an output signal of substantially constant amplitude when the first reference potential is exceeded. Pulse width detector means are coupled to the comparator means for producing an output signal representative of the width of the constant amplitude comparator output signal. Feedback means are coupled to a second source of reference potential and the detector output signal for varying the first reference potential coupled to the comparator means for maintaining the width of the comparator output signal constant.

DESCRIPTION OF THE INVENTION

Figure 1:
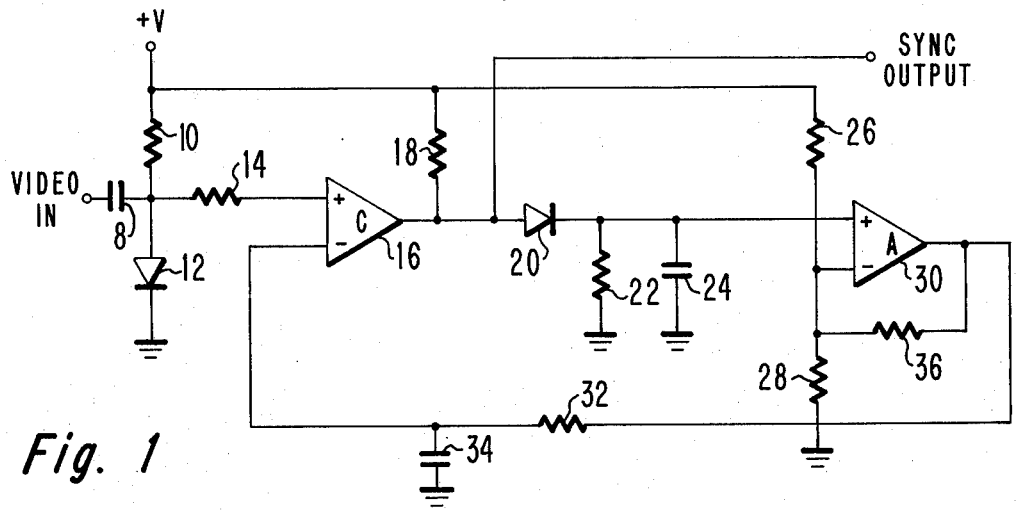
FIG. 1 is a detailed schematic of a constant amplitude-constant width sync separator and regenerating circuit embodying the present invention.

In FIG. 1, a composite video signal is coupled by a capacitor 8 to the common point of a clamp circuit comprising the series combination of a resistor 10 and diode 12 coupled between a source of voltage +V and a point of reference potential (ground). Diode 12 is poled so as to limit the positive excursions of the applied video signal and clamp the sync tips to a point of reference of substantially zero, as is illustrated in waveforms 40 and 41 of FIGS. 2a and 2b. The clamped input signal from resistor 10 and diode 12 is coupled by means of a resistor 14 to the positive input of a comparator 16. The output terminal of comparator 16 is coupled to the common point of an output clamp and detector circuit comprising the series combination of a resistor 18 and diode 20 coupled between a source of potential +V and a detector network 22, 24 which comprises a parallel combination of resistor 22 and capacitor 24 coupled from the other end of diode 20 to ground. The output signal from the detector network 22, 24 is coupled to the positive input terminal of an operational amplifier 30. The output terminal of comparator 16 is also coupled to an output terminal identified as SYNC OUTPUT. The negative input of comparator 16 is coupled to a reference voltage, developed by operational amplifier 30, by means of a filter network comprising resistor 32 and capacitor 34. A voltage divider, comprising the series combination of resistors 26 and 28, is coupled between source of voltge +V and ground. The common point of the voltage divider 26, 28 is coupled to the negative input terminal of amplifier 30 for providing a reference potential thereto; additionally, a feedback resistor 36 is coupled from the output terminal of amplifier 30 and the negative input summing junction of amplifier 30. In this configuration, amplifier 30 operates as an operational amplifier to maintain its output voltage constant in proportion to the reference voltage applied at its negative input terminal from voltage divider 26, 28. As will be explained below, a changing positive voltage proportional to the width of the comparator 16 output signal applied to the positive input terminal of amplifier 30 from detector network 22, 24 will add or subtract from the negative reference voltage output of amplifier 30.

Figure 2A:
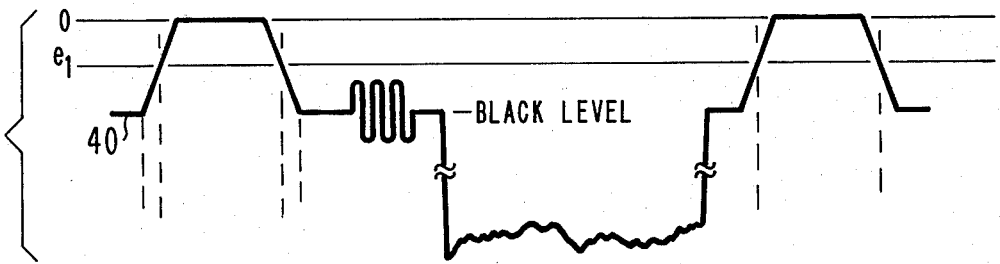
FIGS. 2a, b and c illustrate waveforms depicting the operation of the circuit of FIG. 1.
Figure 2B:
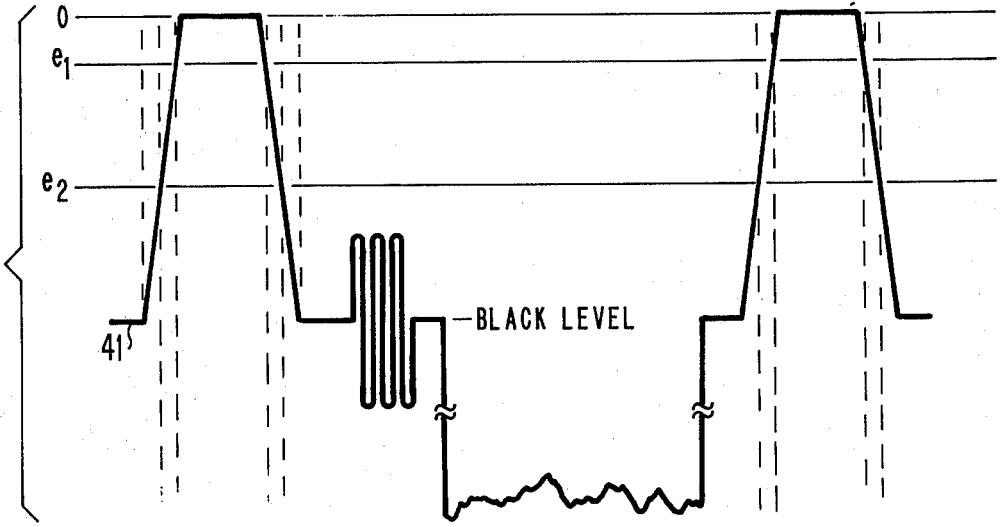
Figure 2C:
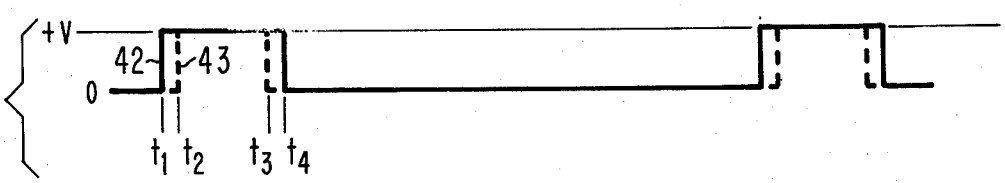

Insofar as described, the operation of the illustrated circuit is as follows: the application of a video signal, illustrated by waveform 40 of FIG. 2a, results in the voltage applied to the positive terminal of comparator 16, exceeding the reference ($e_1$ of FIG. 2a) applied to the negative input terminal of comparator 16. At this point, the comparator output signal at the output terminal of comparator 16, which is held at a voltage close to +V by means of resistor 18 and forward-biased diode 20 and resistor 22 coupled from the output terminal of comparator 16 and a source of voltage +V, changes its output signal level to develop a constant amplitude pulse of a voltage value close to +V, as illustrated by time $t_1 - t_4$ of waveform 42 in FIG. 2c. In the event that the video signal input to comparator 16 changes substantially in amplitude, as illustrated by waveform 41 of FIG. 2b, without a corresponding change in reference threshold $e_1$, the output of comparator 16 narrows in width, as illustrated by time $t_2 - t_3$ of waveform 43 in FIG. 2c; because the selected reference $e_1$ now causes the comparator 16 output signal to change its output level at a proportionally narrower portion of the defined rise time of the synchronizing component of the composite video signal. This change in duration of the regenerated sync pulse affects the timing of synchronization and, as previously stated, is undesirable when attempting genlock and/or special effects operations. Diode 20, resistor 22 and capacitor 24, in the form of a pulse width detector which provides an average D.C. value coupled in a feedback path from the output terminal of comparator 16 to the positive input terminal of amplifier 30, will substantially eliminate this source of timing error.

The D.C. value established across capacitor 24 is applied to the positive input terminal of amplifier 30 where it is combined with the output reference potential from amplifier 30, as established by the voltage divider 26, 28, to establish a new reference output potential from amplifier 30. The new reference potential value at the output terminal of amplifier 30 is coupled by means of filter network 32, 34, which serves to further stabilize the reference output signal at the input of comparator 16 during each television line, to the negative input of comparator 16 so as to correct the sampling point on the incoming waveform (41 of FIG. 2b), as illustrated by new threshold level $e_2$ of FIG. 2b, so as to maintain the desired pulse width output ($t_1 - t_4$ of waveform 42 of FIG. 2c) from comparator 16. The signal, now of constant amplitude and constant width, appearing at the output terminal of comparator 16, is coupled to an output terminal identified as SYNC OUTPUT and represents the desired regenerated sync signal.

Diode 20 provides a low forward impedance charging path into capacitor 24 for positive going portions of the output signal from comparator 16. Diode 20 also provides a highly isolated discharge path, primarily resistor 22, for capacitor 24. Capacitor 24 is made large to achieve a time constant which insures that the charging time constant of the detector circuit is consistent with the frequency range of the applied sync signals to insure an effective pulse width detection; therefore, it is understood that the detector circuit operates as a pulse width detector and not as a peak detector, the latter of which would not provide operation in accordance with the invention. In addition, the highly isolated discharge path provided by diode 20 helps to maintain a higher average D.C. voltage level across capacitor 24 which lessens the gain requirements of amplifier 30.

The following component designations and values have been employed in a sync regenerator embodying the invention:

| Comparator | 16 | National LM219 |
|---|---|---|
| Amplifier | 30 | Motorola 3503 |
| Diode | 12, 20 | 1N914 |
| Resistor | 10 | 47.5 Kilohms |
| Resistor | 14 | 5110 ohms |
| Resistor | 18 | 2940 ohms |
| Resistor | 22 | 88.7 Kilohms |
| Resistor | 26 | 3240 ohms |
| Resistor | 28 | 9090 ohms |
| Resistor | 36 | 20 Kilohms |
| Resistor | 32 | 1 Kilohm |
| Capacitor | 24 | 22 μfd |
| Capacitor | 34 | .1 μfd |
| Voltage | +V | 10 volts |

What is claimed is:

1. A circuit for regenerating synchronizing information signals, said synchronizing information signals having a varying amplitude and width, comprising:
    a source of first reference potential;
    comparator means responsive to said synchronizing information signals and said reference potential for developing an output signal of substantially constant amplitude when said synchronizing information signals exceed said first reference potential;
    pulse width detector means coupled to said comparator means for producing an output signal representative of the width of said constant amplitude comparator output signal;
    a source of second reference potential; and
    feedback means coupled to said source of second reference potential and said detector means and responsive to said detector output signal for varying said first reference potential coupled to said comparator means for maintaining the width of said comparator output signal constant.

2. A circuit according to claim 1 wherein said pulse width detector means comprises a diode coupled to a point of reference potential by the parallel combination of a resistor and capacitor for providing a low forward impedance charging path to said capacitor, said detector means having a charging-discharging time constant to insure effective pulse width detection at a television line rate.

3. A circuit according to claim 1 wherein said feedback means includes a filter network to further stabilize said first reference potential at said comparator means during each television line.

* * * * *

UNITED STATES PATENT OFFICE
CERTIFICATE OF CORRECTION

PATENT NO. : 4,064,541

DATED : December 20, 1977

INVENTOR(S) : Dennis Michael Schneider et al.

It is certified that error appears in the above-identified patent and that said Letters Patent are hereby corrected as shown below:

Column 2, Line 42 - "voltge" should be -- voltage -- ; and

Column 4, Line 42 - after "coupled" insert -- from the output of said comparator means -- .

Signed and Sealed this

Fourth Day of July 1978

[SEAL]

Attest:

RUTH C. MASON
Attesting Officer

DONALD W. BANNER
Commissioner of Patents and Trademarks